(12) United States Patent
Park

(10) Patent No.: US 6,934,306 B1
(45) Date of Patent: Aug. 23, 2005

(54) DUALIZED TIME/FREQUENCY GENERATION APPARATUS IN CDMA SYSTEM

(75) Inventor: Seong-Ik Park, Kyoungki-do (KR)

(73) Assignee: Hyundai Electronics Ind., Co. Ltd., Ichon-si (KR)

(*) Notice: Subject to any disclaimer, the term of this patent is extended or adjusted under 35 U.S.C. 154(b) by 0 days.

(21) Appl. No.: 09/064,280

(22) Filed: Apr. 22, 1998

(30) Foreign Application Priority Data

Jun. 24, 1997 (KR) .............................. 97-26919

(51) Int. Cl.$^7$ ................................. H04J 13/00
(52) U.S. Cl. .................... 370/517; 370/216; 370/320
(58) Field of Search .................. 370/216–228, 370/507, 516, 517, 320, 321, 324; 714/3

(56) References Cited

U.S. PATENT DOCUMENTS

| | | | |
|---|---|---|---|
| 4,644,498 A | * | 2/1987 | Bedard et al. ............... 364/900 |
| 5,146,585 A | * | 9/1992 | Smith, III .................... 395/550 |
| 5,325,516 A | | 6/1994 | Blomgren et al. |
| 5,327,402 A | * | 7/1994 | Shinomiya ................... 368/46 |
| 5,381,543 A | | 1/1995 | Blomgren et al. |
| 5,448,715 A | | 9/1995 | Lelm et al. |
| 5,903,543 A | * | 5/1999 | Lee et al. .................... 370/216 |
| 6,061,409 A | * | 5/2000 | Moriya ........................ 375/357 |
| 6,122,756 A | * | 9/2000 | Baxter et al. ................. 714/30 |

* cited by examiner

Primary Examiner—Min Jung
(74) Attorney, Agent, or Firm—Lackenbach Siegel; J. Harold Nissen

(57) ABSTRACT

A dual time/frequency generation apparatus having a first and a second time/frequency generator for generating time/frequency signals in a code division multiple access CDMA system, including: a first time/frequency dualizing unit for mutually synchronizing a first and a second time clock, 10 MHz frequencies, and time data TOD signals respectively received from the first and second time/frequency generators in accordance with the delay value information and monitoring the operation of a second time/frequency dualizing unit; a second time/frequency dualizing unit for synchronizing the first and second time clocks, 10 MHz frequencies, and time data TOD signals respectively received from the first and second time/frequency generators according to delay value information and monitoring the operation of the first time/frequency dualizing unit to control its output; and a time/frequency out put unit for selecting and outputting one of the other output signs from the first and second time/frequency dualizing units.

15 Claims, 4 Drawing Sheets

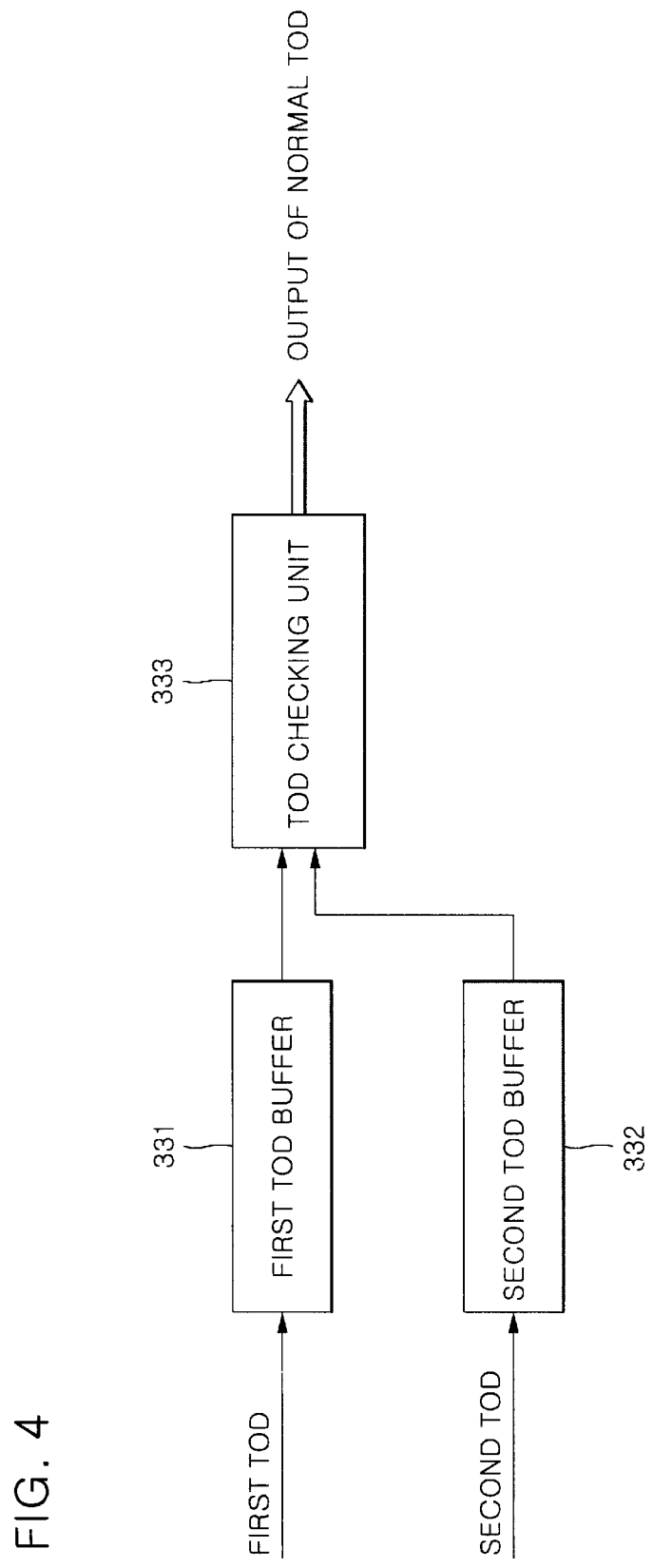

DUALIZED TIME/FREQUENCY GENERATION APPARATUS IN CDMA SYSTEM

BACKGROUND OF THE INVENTION

1. Field of the Invention

The present invention relates to a dual time/frequency generation apparatus for generating normal time and frequency signals even if trouble occurs in a main time/frequency generator by substituting the main time/frequency generator having the trouble with a sub time/frequency generator in a code division multiple access (CDMA) system.

2. Discussion of Related Art

A time/frequency generation apparatus in a CDMA system usually Internally includes a rubidium oscillator as an independent time generator and keeps a standard time by continuously comparing an its internal time with came information received from satellites in a global positioning system (GPS) and correcting an internal time and time length. Each satellite in the GPS has extremely accurate cesium and rubidium atomic clocks and provides an extremely accurate measurement of time. The time/frequency generation apparatus generates Lime data, Time of Day (TOD), according to the time information received from the GPS satellite via a GPS receiver, 10 MHz frequency (synchronizing reference frequency in the CDMA system), and a time clock (1 pulse per second: 1 PPS). The TOD, as time data which is generated every even seconds by the time/frequency generation apparatus, is a signal Including information or time such as second, minute, hour, day, and year, and information about normal or abnormal operation status of the time/frequency generation apparatus. 10 MHz frequency is a generation signal of the rubidium which is adjusted based upon the time information received from the GPS satellite. A 1 PPS time clock is a signal produced by dividing 10 MHz by 10 million.

Such time/frequency generation apparatus in the CDMA system is implemented in a dual system to promote accuracy and reliability of the system. FIG. 1 is a block diagram of a conventional dual time/frequency generation apparatus in the CDMA system. As shown in the drawing, the dual time/frequency generation apparatus includes: a first time/frequency generator 1 for generating time/frequency signals such as TOD, 10 MHz frequency, and 1 PPS signal; a second time/frequency generator 2 for generating the same time/frequency signals as the output signals of the first time/frequency generator 1 in order to continuously provide the time/frequency signals to the CDMA system even when trouble occurs in the first time/frequency generator 1; and a time/frequency output unit 5 for selectively outputting the signals from the first and second time/frequency generators 1 and 2 through manual operation.

The time/frequency output unit 5 includes: a first switch 6 for selecting one of the first TOD and second TOD respectively outputted by the first and second rime/frequency generators 1 and 2 through external operation; a second switch 7 for selecting one of the first and second time clocks IC respectively outputted by the first and second time/frequency generators 1 and 2 through external operation; and a third switch 8 for selecting one of the first and second 10 MHz frequencies respectively outputted by the first and second time/frequency generators 1 and 2 through external operation.

Operation of such conventional dual time/frequency generation apparatus in the CDMA system is as follows. The first time/frequency generator 1 which is selected as a main generator generates the time/frequency signals and the second time/frequency generator 2 which is selected as a spare generates the same time/frequency signals through the same operation as that of the first time/frequency generator 1, the time/frequency signals cannot be provided to the CDMA system, which makes the whole system stop. A system operator then selects the second time/frequency generator 2 as the main one and makes the second time/frequency generator 2 provide the time/frequency signals to the CDMA system by manually operating the first to third switches 6 to 8 in the time/frequency output unit 5.

By employing a spare time/frequency generator in addition to a main one, even when one time/frequency generator has trouble, the other normal time/frequency generator performs the same function, thereby minimizing impact of abnormal time/frequency signals to the CDMA system.

However, in the conventional dual time/frequency generation apparatus of the CDMA system, since the system operator manually switches from the main time/frequency generator to the sub one after sensing the malfunction of the main time/frequency generator, the abnormal time/frequency signals, such as time jump and frequency jump, can be outputted.

Moreover, even if errors occur in just ore signal of the TOD, 10 MHz frequency, and 1 PPS time clock, the whole time/frequency generator is switched, thereby reducing an average life of the system.

SUMMARY OF THE INVENTION

Accordingly, the present invention is directed to a dual time/frequency generation apparatus in a CDMA system that substantially obviates one or more of the limitations and disadvantages of the related art.

An object of the present invention is to provide a dual time/frequency generation apparatus in a CDMA system, wherein, in case of occurrence of malfunction in a main time/frequency generator, a switch from the main time/frequency generator to a sub time/frequency generator is automatically performed, thereby generating normal time/frequency signals without time jump or phase jump.

Another object of the present invention is to provide a dual time/frequency generation apparatus in a CDMA system, wherein a dual time/frequency dualizing unit for generating dual output signals of a dual time/frequency generator is implemented, outputting dual time/frequency signals of a main and sub time/frequency dualizing units in synchronization with each other, whereby, in case of malfunction of the main time/frequency dualizing unit, inhibiting the output of the main time/frequency dualizing unit under the control of the sub time/frequency dualizing unit and allowing the sub time/frequency dualizing unit to output normal time/frequency signals continuously, thereby completely achieving the performance of a dual time/frequency generation apparatus.

Additional features and advantages of the invention will be set forth in the description which follows, and in part will be apparent from the description, or may be learned by practice of the invention. The objectives and other advantages of she invention will be realized and attained by the structure as illustrated in the written description and claims hereof, as well as the appended drawings.

To achieve these and other advantages, and in accordance with the purpose of the present invention as embodied and broadly described, a time/frequency generator and a time/frequency dualizing unit are dually implemented, the time/ frequency generator generating time/frequency signals in a CDMA system, the time/frequency dualizing unit generating the time/frequency signals from the dual time/frequency generator as dual signals. The main and sub time/frequency dualizing units mutually transmit/receive time/frequency synchronization information and synchronize their output time/frequency signals with each other based upon the information. The main and sub time/frequency dualizing units also mutually transmit/receive information about their operation status, thereby inhibiting output of a time/frequency dualizing unit having trouble and outputting normal time/frequency signals of a normal time/frequency dualizing unit.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a block diagram of the buffering/normality checking unit in a time/frequency dualizing unit according to the present invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, the present invention is described below in detail.

Figure 1:
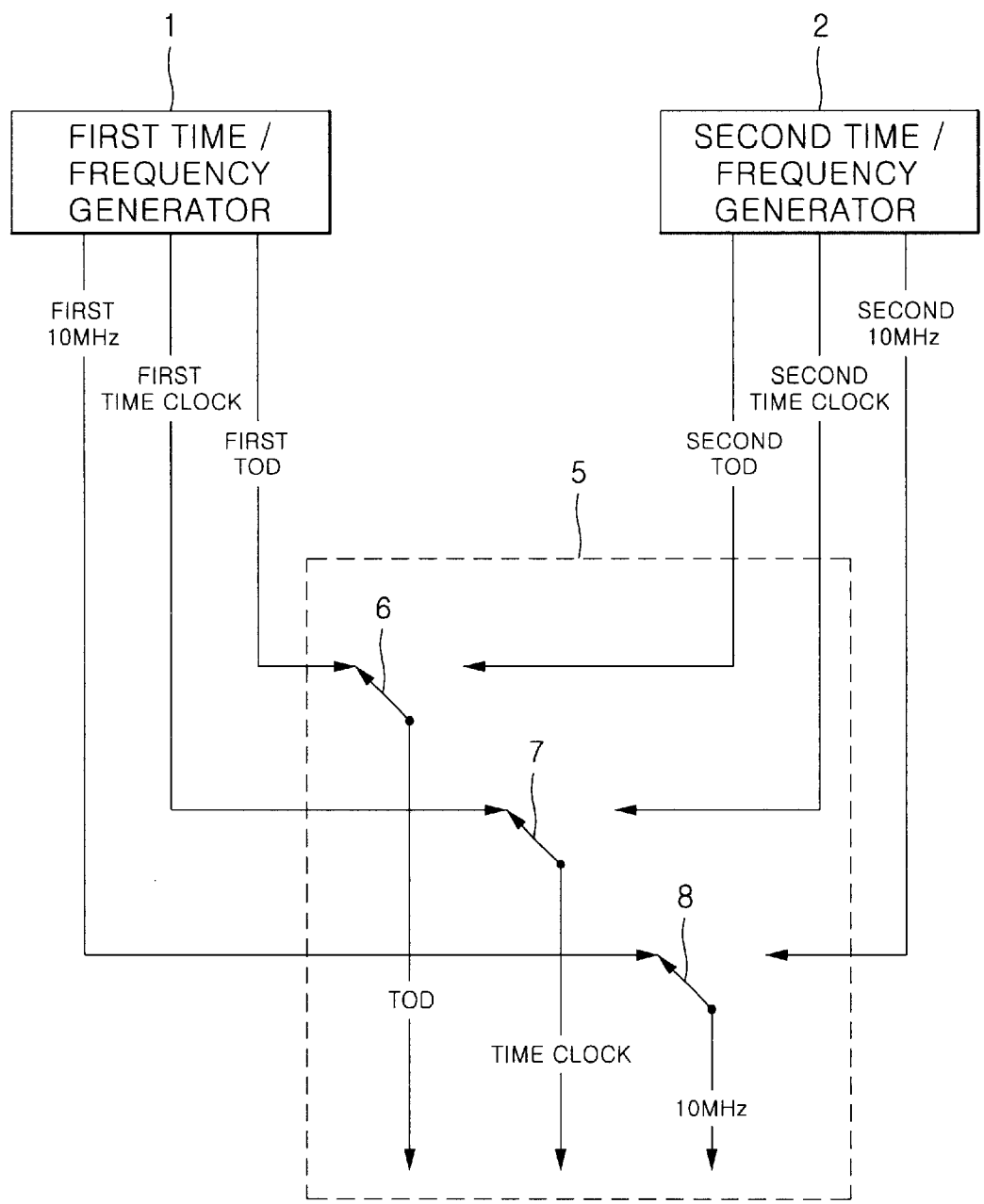
FIG. 1 is a block diagram of a convention dual time/frequency generation apparatus in a CDMA system.
Figure 2:
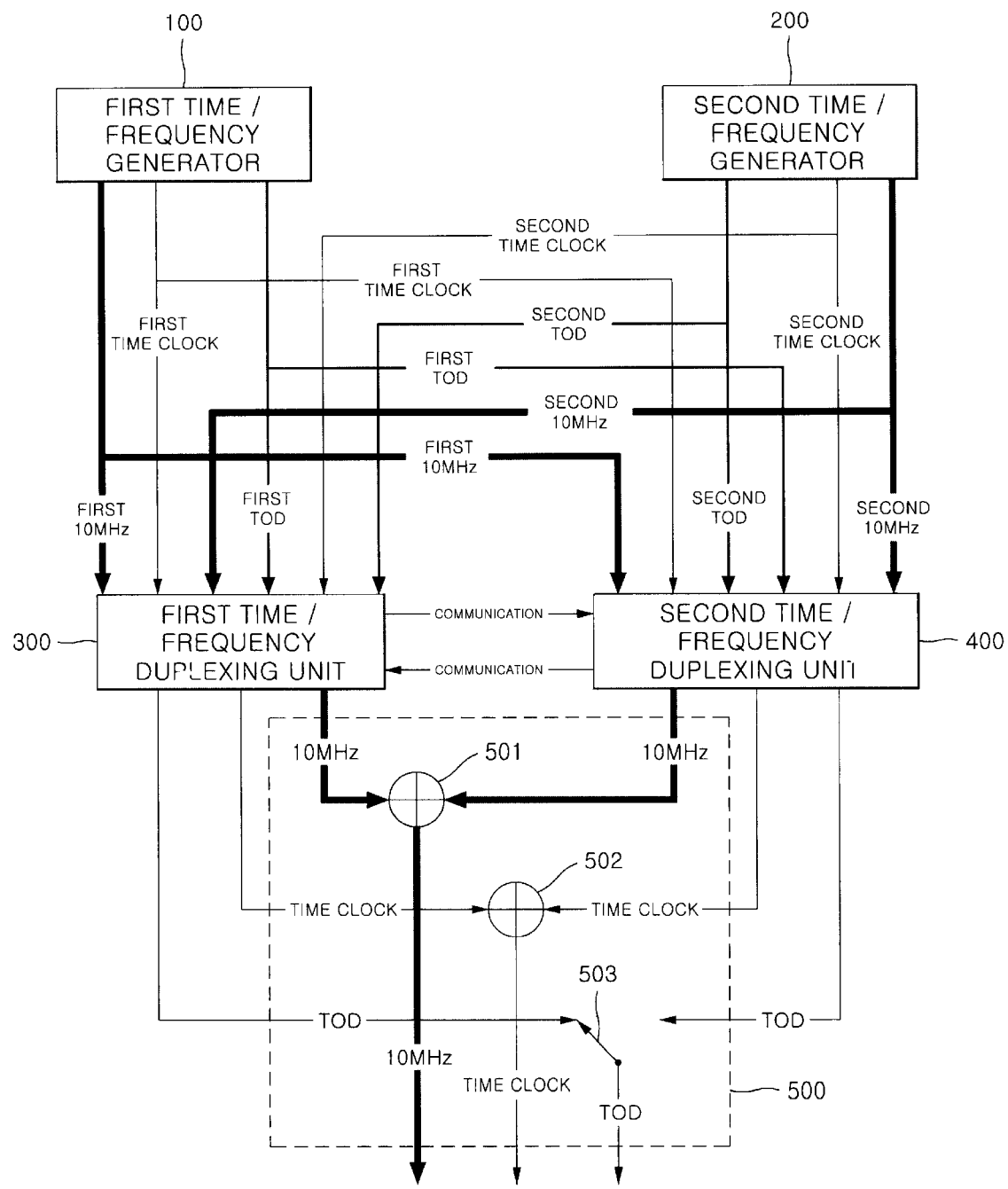
FIG. 2 is a block diagram of a dual time/frequency generation apparatus in a CDMA system according to the present invention.

As shown in FIG. 2, the dual time/frequency generation apparatus in the CDMA system according to the present invention includes: a first time/frequency generator 100 for generating a first time clock (1 PPS), first 10 MHz frequency (synchronizing reference frequency in the CDMA system), and first TOD signal; a second time/frequency generator 200 for generating a second clock, second 10 MHz frequency, and second TOD signal; a first time/frequency dualizing unit 300 for mutually synchronizing the first and second time clocks, 10 MHz frequencies, and time data TOD signals respectively received from the first and second time/frequency generators 100 and 200 according to delay value information and controlling output of the time/frequency signals while monitoring the operation of a second time/frequency unit 400; a second time/frequency dualizing unit 400 for mutually synchronizing the first and second time clocks, 10 MHz frequencies, and time data TOD signals respectively received from the first and second time/frequency generators 100 and 200 according to delay value information and controlling output of the time/frequency signals while monitoring the operation of the first time/frequency dualizing unit 300; and a time/frequency output unit 500 for automatically and selectively outputting the signals transmitted from the first and second time/frequency dualizing units 300 and 400.

Each time/frequency dualizing unit includes: a central processing unit 301 for controlling to respectively synchronize the first time clock and the first 10 MHz frequency generated by the first time/frequency generator 100 with the second time clock and the second 10 MHz frequency generated by the second time/frequency generator 200, synchronizing its time/frequency output with the other's while communicating with the other, monitoring the other's operation status through transmission/reception of information about the operation status to/from the other time/frequency dualizing unit, and inhibiting output of the signals in case that trouble is detected; a buffering/normality checking unit 330 for storing the first and second TOD signals respectively received from the first and second time/frequency generators 100 and 200 in separate internal buffers and checking information on the operation status of the time/frequency generator contained in the TOD signal so as to output the TOD received from the time/frequency generator which is in normal status; a time clock dualizing unit 310 for comparing the second time clock with reference to the first time clock from the first time/frequency generator 100 set to a main one, transmitting information of a time difference to the central processing unit 301 and delaying the phase of the second time clock to compensate for the time difference according to the control of the central processing unit 301, thereby synchronizing the second time clock with the first time clock; a buffer 315 for buffering the time clock transmitted from the time clock dualizing unit 310; a relay switch 316 for outputting the time clock from the buffer 315 to the time/frequency output unit 500 based upon an output inhibition signal transmitted from the other time/frequency dualizing unit; a frequency dualizing unit 320 for comparing the second 10 MHz with reference to the first 10 MHz from the first time/frequency generator 100 set to the main one, transmitting information of a phase difference to the central processing unit 301 and delaying the phase of the 10 MHz to compensate for the phase difference according to the control of the central processing unit 301, thereby synchronizing the second 10 MHz with the first 10 MHz; a filter 325 for filtering off noise from the 10 MHz received from the frequency dualizing unit 320; and a relay switch 326 for transmitting the 10 MHz from the filter 325 to the time/frequency output unit based upon an output inhibition signal transmitted from the other time/frequency dualizing unit.

The buffering/normality checking unit 330 includes: a first TOD buffer 331 for buffering the first TOD transmitted from the first time/frequency generator 100; a second TOD buffer 332 for buffering the second TOD transmitted from the second time/frequency generator 200; and a TOD checking unit 333 for checking the information about the operation status of the time/frequency generators contained in the signals from the first and second buffers 331 and 332 and outputting the first TOD if the first time/frequency generator 100 is determined to operate in normal status and, alternatively, outputting the second TOD if the first time/frequency generator 100 is determined to operate in abnormal status.

The time clock dualizing unit 310 includes: a time clock phase comparator 313 for comparing the first and second time clocks respectively generated by the first and second time/frequency generators 100 and 200 and transmitting the time difference derived from comparing to the central processing unit 301; a first time clock variable delay unit 311 for compensating the phase of the first time clock using various degrees of phase adjustment according to the control of the central processing unit 301; a second time clock variable delay unit 312 for compensating the phase of the second time clock using various degrees of phase adjustment according to the control of the central processing unit 301; and an OR element 314 for performing a wired OR operating with respect to the time clocks from the first and second time clock variable delay units 311 and 312.

The frequency dualizing unit 320 includes: a 10 MHz phase comparator 323 for comparing the second 10 MHz from the second time/frequency generator 200 with reference to the first 10 MHz from the first time/frequency generator 100 set to a main one and transmitting a phase difference to the central processing unit 301; a first 10 MHz variable delay unit 321 for compensating the first 10 MHz by delaying it as much as the phase difference according to the control of the central processing unit 301; a second 10 MHz variable delay unit 322 for compensating the second 10 MHz by delaying it as much as the phase difference according to the control of the central processing unit 301; a switch 324 for receiving the 10 MHz frequencies outputting in synchronization with each other by the first and second 10 MHz variable delay units 321 and 322 and selecting and outputting one of them according to the control of the central processing unit 301.

The time/frequency output unit 500 includes: first OR element 501 for performing the wired OR operation with respect to dual frequencies transmitted from the first and second time/frequency dualizing units 300 and 400; a second OR element 502 for performing the wired OR operation with respect to dual time clocks transmitted from the first and second time/frequency dualizing units 300 and 400; and a switch 503 for selectively outputting the dual time data respectively transmitted from the first and second time/frequency dualizing units 300 and 400 according to the control of the central processing unit 301.

The following description concerns the operation of the dual time/frequency generation apparatus in the CDMA system according to the present invention.

The first and second time/frequency generators 100 and 200 respectively generate the time clock signals, 10 MHz signals, and TOD signals. The first and second time/frequency dualizing 300 and 400 respectively outputs the signals from the first and second time/frequency generators 100 and 200 in a duplex system. The dual signals are transmitted to the time/frequency output unit 500 in synchronization with each other through synchronization information communication between the time/frequency dualizing units 300 and 400. The time/frequency output unit 500 automatically and selectively outputs the signals from the first and second time/frequency dualizing unit 300 and 400.

The operation of the dual time/frequency generation apparatus is described below focusing on the time clock.

Figure 3:
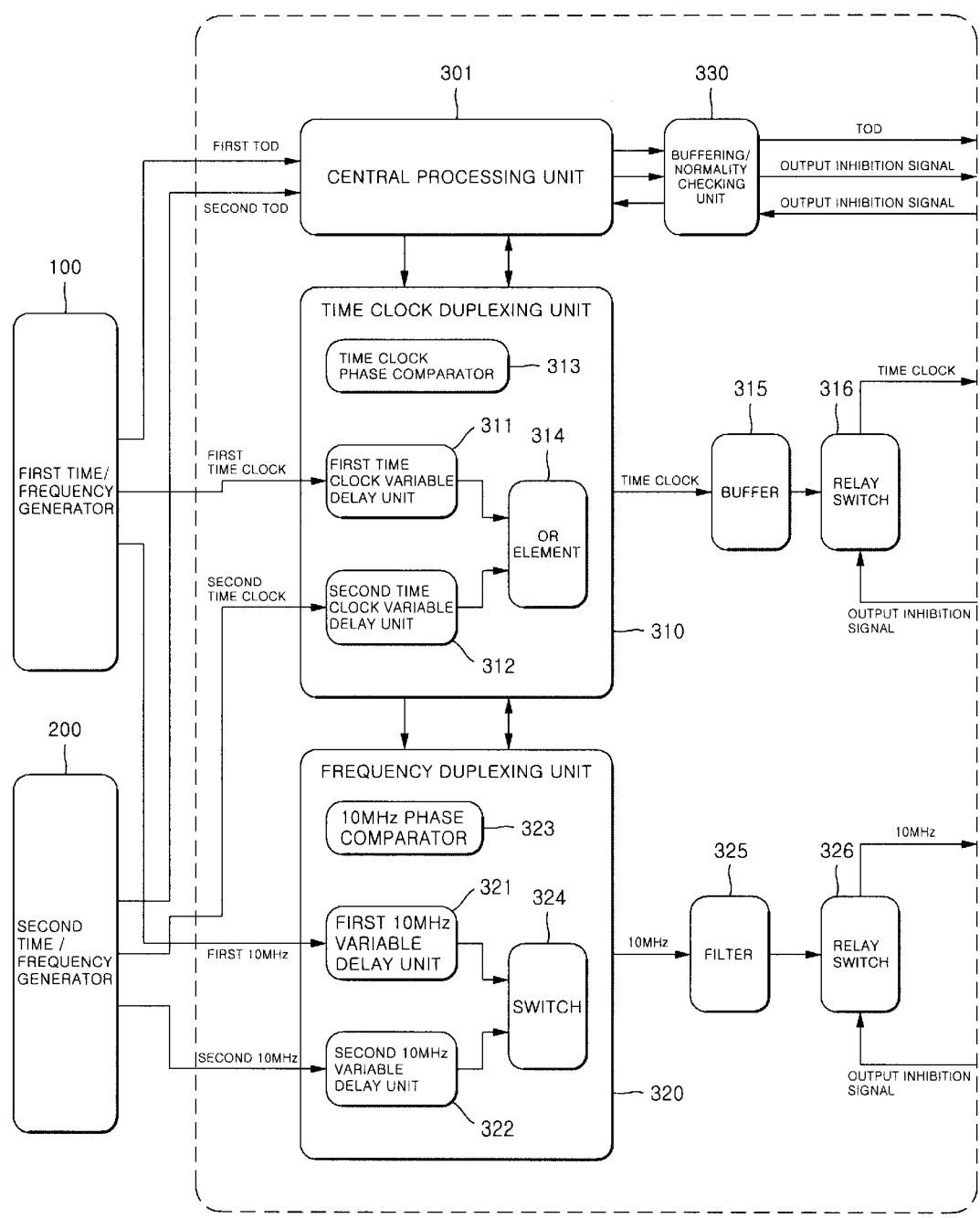
FIG. 3 is a block diagram of a time/frequency dualizing unit according to the present invention.

The first time/frequency generator 100 set to the main generates the first time clock and transmits it to the respective time clock dualizing units in the first and second time/frequency dualizing units 300 and 400 (here, the first and second time/frequency dualizing units 300 and 400 have the same configuration as shown in FIG. 3, but the first time/frequency dualizing unit 300 is set to the main and the second time/frequency dualizing unit 400 is set to the sub, so, for illustrative purpose, FIG. 3 is assumed to show the configuration of the first time/frequency dualizing unit 300, and the following description is limited to only the first time/frequency dualizing unit 300). At the same time, the second time/frequency generator 200 set to the sub generates the second time clock and transmits it to each time clock dualizing unit in the first and second time/frequency dualizing 300 and 400.

On the other hand, once supply voltage is applied, the first and second time clock variable delay units 311 and 312 in the first time clock dualizing unit 310 are initialized to output the first and second time clocks transmitted from the first and second time/frequency generators 100 and 200 as they were without change in their phases. The time clock phase comparator 313 compares a point of a rising edge in the first time clock and a point of a rising edge in the second time clock to detect a time difference between them and transmits width depending on the time difference between the first and second time clocks other than by changing the phase just as much as a predetermined adjustment phase width.

The OR element 314 then performs the wired OR operation with respect to the synchronized first and second time clocks and outputs a result of the wired OR operation to the buffer 315.

The second time/frequency dualizing unit 400 also synchronizes the first and second time clocks with each other and outputs a result of the wired OR operation of them through the same method as the method performed by the first time/frequency dualizing unit 300.

The first time/frequency dualizing unit 300 set to the main obtains synchronization information about the output time clock of the second time/frequency dualizing unit 400 and information about the operation status of the second time/frequency dualizing unit 400 by communicating with the sub, second time/frequency dualizing unit 400. The second time/frequency dualizing unit 400 also obtains synchronization information about the output time clock of the first time/frequency dualizing unit 300 and information about the operation status of the first time/frequency dualizing unit 300.

If the first time/frequency dualizing unit 300 is determined to be in normal operation status according to the information, the first time/frequency dualizing unit 300 sends the time clock to the time /frequency output unit 500, and at the same time, the second time/frequency dualizing unit 400 compensates its output time clock according to the time clock synchronization information of the first time/frequency dualizing unit 300 and sends the output time clock to the time/frequency output unit 500. Consequently, the output time clocks of the first and second time/frequency dualizing units 300 and 400 are synchronized with each other and simultaneously transmitted to the time/frequency output unit 500.

The OR element 502 in the time/frequency output unit 500 performs an OR operation with respect to the synchronized time clocks respectively from the first and second time/frequency dualizing units 300 and 400 and outputs a result of he OR operation. Through this operation, the dual first and second time clocks respectively generated by the first and second time/frequency generators 100 and 200 is newly generated as a dual time clock by the first and second time/frequency dualizing units 300 and 400. The time/frequency output unit 500 performs the wired OR operation with respect to the output signals of the first and second time/frequency dualizing units 300 and 400 and outputs a result.

The first and second time/frequency dualizing units 300 and 400 mutually check the other's operation status by communicating with each other and sharing the detected information. If the pieces of the information they mutually share and detect are different, this is assumed that trouble occurs.

When the trouble occurs in the first time/frequency dualizing unit 300, the second time/frequency dualizing unit 400 transmits an output inhibition signal for inhibiting output of the time clock to the first time frequency dualizing unit 300. The relay switch 316 in the first time/frequency dualizing unit 300 does not output the time clock in response to the output inhibition signal. The OR element 502 is in the time/frequency output unit 500 receives the normal output signal from the second time/frequency dualizing unit 400 and outputs the time clock without a distortion.

The first time/frequency generator 100 set to the main generates the fist 10 MHz and transmits it to the first and second time/frequency dualizing units 300 and 400. The second time/frequency generator 200 set to the sub generates the second 10 MHz and transmits it to the first and second time/frequency dualizing units 300 and 400. The 10 MHz phase comparator 323 of the frequency dualizing unit 320 in the fist time/frequency dualizing unit 300 compares the phase of the second 10 MHz with the first 10 MHz which is provided to the system as a reference and transmits a phase difference derived from comparing to the central processing unit 301. The first and second 10 MHz variable delay units 321 and 322 compensate the phases of the first and second 10 MHz frequencies for the phase difference according to the control of the central processing unit 301 to synchronize the second 10 MHz with the fist 10 MHz. If the first and second 10 MHz frequencies are outputted in synchronization with each other to the switch 324, the switch 324 transmits the first 10 MHz, the reference frequency, to the following stage.

Simultaneously, the frequency dualizing unit in the second time/frequency dualizing unit 400 also outputs the first and second 10 MHz frequencies in synchronization with each other through the same method as that performed by the frequency dualizing unit 320 in the first time/frequency dualizing unit 300.

The first and second time/frequency dualizing units 300 and 400 control to synchronize the output 10 MHz of the first time/frequency dualizing unit 300 with the output 10 MHz of the second time/frequency dualizing unit 400 while continuously and mutually transmitting /receiving information of a phase delay value. The OR element 501 in the time/frequency output unit 500 performs the OR operation with respect to the 10 MHz frequencies from the first and second time/frequency dualizing unit 400 and outputs a result to the following stage.

If errors are detected from the 10 MHz from the first time/frequency dualizing unit 300 as a result of mutual communication between the first and second time/frequency dualizing unit 400 transmits an output inhibition signal against the 10 MHz to the first time/frequency dualizing unit 300. The relay switch 326 in the first time/frequency dualizing unit 300 does not output the 10 MHz according to this output inhibition signal. Therefore, the OR element 501 in the time/frequency output unit 500 outputs the normal 10 MHz transmitted from the second time/frequency dualizing unit 400, thereby stably providing the 10 MHz frequency to the CDMA system.

The following description concerns operation of the dual time/frequency generation apparatus for generating TOD.

The first time/frequency generator 100 set to the main generates the first TOD and transmits it to the first and second time/frequency dualizing units 300 and 400. The second time/frequency generator 200 set to the sub generates the second TOD and transmits it to the first and second time/frequency dualizing units 300 and 400. The first TOD contains information about the operation status of the first time/frequency generator 100, and the second TOD contains information about the operation status of the second time/frequency generator 200.

The central processing unit 301 in the first time/frequency dualizing unit 300 recognizes the operation status of the first and second time/frequency generators 100 and 200 based upon the first and second TOD signals and adds information about the operation status of the first time/frequency dualizing unit 300 to the TOD signals. Simultaneously, the central processing unit i the second time/frequency dualizing unit 400 also recognizes the operation status of the first and second time/frequency generators 100 and 200 based upon the first and second TOD signals and adds information about the operation status of the second time/frequency dualizing unit 400 to the TOD signals.

The buffering/normality checking unit 330 in the first time/frequency dualizing unit 300 performs buffering of the first and second TOD signals using the first and second buffers 331 and 332 respectively. If no trouble is detected in the first and second time/frequency generators 100 and 200, the buffering/normality checking unit 330 outputs the first TOD to the time/frequency output unit 500 and the second time/frequency dualizing unit 400. The second time/frequency dualizing unit 400 also transmits the first TOD in the same manner illustrated above. The first time/frequency dualizing unit 300 receives the TOD from the second time/frequency dualizing unit 400 and determines whether or not the second time/frequency dualizing unit 400 operates in normal status based upon the information contained in the TOD. If the trouble is detected, an output inhibition signal is transmitted o the second time/frequency dualizing unit 400. When the output inhibition signal is transmitted from the second time/frequency dualizing unit 400 to the first time/frequency dualizing unit 300, the first time/frequency dualizing unit 300 inhibits output of the TOD signal. The switch 503 in the time/frequency output unit 500 transmits the normal TOD from the second time/frequency dualizing unit 400 to the CDMA system.

As illustrated above, this invention generates normal time/frequency signals by implementing a dual system in a time/frequency generation apparatus and substituting one time/frequency generator having trouble with the other normal time/frequency generator, thereby improving accuracy and reliability of the CDMA system.

In addition, this invention generates stable time/frequency signals without time jump or phase jump through implementation of a double dualizing system in a time/frequency generation apparatus. The implementation of a double dualizing system also makes it possible to prolong an average life of the CDMA system.

It will be apparent to those skilled in the art that various modifications and variations can be made in a dualizing time/frequency generation apparatus in a CDMA system of the present invention without deviating from the spirit or scope of the invention. Thus, it is intended that the present invention cover the modifications and variations of this invention provided they come within the scope of the appended claims and their equivalents.

The first and second time/frequency duplexing units 300 and 400 mutually check the other's operation status by communicating with each other and sharing the detected information. If the pieces of the information they mutually share and detect are different, this is assumed that trouble occurs.

When the trouble occurs in the first time/frequency duplexing unit 300, the second time/frequency duplexing unit 400 transmits an output inhibition signal for inhibiting IC out of the time clock to the first time/frequency duplexing unit 300. The relay switch 316 in the first time/frequency duplexing unit 300 does not output the time clock in response to the output inhibition signal. The OR element 502 In the time/frequency output unit 500 receives the normal output signal from the second time/frequency duplexing unit 400 and outputs the time clock without a distortion.

The following description on the operation of this invention focuses on the 10 MHz frequency which is a reference for synchronization in the CDMA system.

The first time/frequency generator 100 set to the main generates the first 10 MHz and transmits it to the first and second time/frequency duplexing units 300 and 400. The second time/frequency generator 200 set to the sub generates the second 10 MHz and transmits it to the first and second time/frequency duplexing units 300 and 400. The 10 MHz phase comparator 323 of the frequency duplexing unit 320 in the first time/frequency duplexing unit 300 compares the phase of the second 10 MHz with the first 10 MHz which is provided to the system as a reference and transmits a phase difference derived from comparing to the central processing unit 301. The first and second 10 MHz variable delay units 321 and 322 compensate the phases of the first and second 10 MHz frequencies for the phase difference according to the control of the central processing unit 301 to synchronize the second 10 MHz with the first 10 MHz. If the first and second 10 MHz frequencies are outputted in synchronization with each other to the switch 324, the switch 324 transmits the first 10 MHz, the reference frequency, to the following stage.

Simultaneously, the frequency duplexing unit in the second time/frequency duplexing unit 400 also outputs the first and second 10 MHz frequencies in synchronization with each other through the same method as that performed by the frequency duplexing unit 320 in the first time/frequency duplexing unit 300.

The first and second time/frequency duplexing units 300 and 400 control to synchronize the output 10 MHz of the first time/frequency duplexing unit 30o with the output 10 MHz of the second time/frequency duplexing unit 400 while continuously and mutually transmitting/receiving information of a phase delay value. The OR element 501 in the time/frequency output unit 500 performs the OR operation with respect to the 10 MHz frequencies from the first and second time/frequency duplexing unit 400 and outputs a result to the following stage.

If errors are detected from the 10 MHz from the first time/frequency duplexing unit 300 as a result of mutual communication between the first and second time/frequency duplexing units 300 and 400, the second time/frequency duplexing unit 400 transmits an output inhibition signal against the 10 MHz to the first time/frequency duplexing unit 300. The relay switch 326 in the first time/frequency duplexing unit 300 does not output the 10 MHz according to this output inhibition signal. Therefore, the OR element 501 in the time/frequency output unit 500 outputs the normal 10 MHz transmitted from the second time/frequency duplexing unit 400, thereby stably providing the 10 MHz frequency to the CDMA system.

The following description concerns operation of the duplex time/frequency generation apparatus for generating TOD.

The first time/frequency generator 100 set to the main generates the first TOD and transmits its to the first and second time/frequency duplexing units 300 and 400. The second time/frequency generator 200 set to the sub generates the second TOD and transmits it to the first and second time/frequency duplexing units 300 and 400. The first TOD contains information about the operation status of the first time/frequency generator 100, and the second TOD contains information about the operation status of the second time/frequency generator 200.

The central processing unit 301 in the first time/frequency duplexing unit 300 recognizes the operation status of the first and second time/frequency generators 100 and 200 based upon the first and second TOD signals and adds information about the operation status of the first time/frequency duplexing unit 300 to the TOD signals. Simultaneously, the central processing unit in the second time/frequency duplexing unit 400 also recognizes the operation status of the first and second time/frequency generators 100 and 200 based upon the first and second TOD signals and adds Information about the operation status of the second time/frequency duplexing unit 400 to the TOD signals.

The buffering/normality checking unit 330 in the first time/frequency duplexing unit 300 performs buffering of the first and second TOD signals using the first and second buffers 331 and 332 respectively. If no trouble is detected in the first and second time/frequency generators 100 and 200, the buffering/normality checking unit 330 outputs the first TOD to the time/frequency output unit 500 and the second time/frequency duplexing unit 400. The second time/frequency duplexing unit 400 also transmits the first TOD in the same manner illustrated above. The first time/frequency duplexing unit 300 receives the TOD from the second time/frequency duplexing unit 400 and determines whether or not the second time/frequency duplexing unit 400 operates in normal status based upon the information contained in the TOD. If the trouble is detected, an output inhibition signal is transmitted to the second time/frequency duplexing unit 400. When the output inhibition signal is transmitted from the second time/frequency duplexing unit 400 to the first time/frequency duplexing unit 300, the first time/frequency duplexing unit 300 inhibits output of the TOD signal. The switch 503 in the time/frequency output unit 500 transmits the normal TOD from the second time/frequency duplexing unit 400 to the CDMA system.

As illustrated above, this invention generates normal time/frequency signals by implementing a duplex system in a time/frequency generation apparatus and substituting one time/frequency generator having trouble with the other normal time/frequency generator, thereby improving accuracy and reliability of the CDMA system.

In addition, this invention generates stable time/frequency signals without time jump or phase jump through implementation of a double duplex system in a time/frequency generation apparatus. The implementation of a double duplex system also makes it possible to prolong an average life of the CDMA system.

It will be apparent to those skilled in the art that various modifications and variations can be made in a duplex time/frequency generation apparatus in a CDMA system of the present invention without deviating from the spirit or scope of the invention. Thus, it is intended that the present invention cover the modifications and variations of this invention provided they come within the scope of the appended claims and their equivalents.

What is claimed is:

1. A dual time/frequency generation apparatus having a first and a second time/frequency generators for generating time/frequency signals in a code division multiple access (CDMA) system, the apparatus comprising:

a first time/frequency dualizing unit for synchronizing first and second time clocks, 10 MHz frequencies, and time data TOD signals respectively received from the first and second time/frequency generators in accordance with delay value information said first time/frequency dualizing unit and monitoring the operation of a second time/frequency dualizing unit to control its output;

a second time/frequency dualizing unit for synchronizing the first and the second time clocks, 10 MHz frequencies, and time data TOD signals respectively received from the first and second time/frequency generators according to delay value information said second time/frequency dualizing unit and monitoring the operation of the first time/frequency dualizing unit to control its output; and a time/frequency output unit for selecting and outputting one of either output signal from the first and second time/frequency dualizing units.

2. The apparatus according to claim 1, wherein each of the first and the second time/frequency dualizing units comprise:

a central processing unit for controlling to synchronize the first time clock and the first 10 MHz frequency generated by the first time/frequency generator with the second time clock and the second 10 MHz frequency generated by the second time/frequency generator, synchronizing time/frequency output signals from the first and second time/frequency dualizing units which communicate with each other to exchange time/frequency synchronization information, monitoring the operation status of the first and the second time/frequency dualizing units by exchanging information about their operation status and preventing either one of the time/frequency dualizing units from outputting signals in case that failures associated with one of them are detected;

a buffering/normality checking unit for storing the first and the second TOD signals respectively received from the first and second time/frequency generators in separate internal buffers and checking information on the operation status of the time/frequency generator contained in the TOD signal so as to output the TOD received from the time/frequency generator which is in normal status;

a time clock dualizing unit for comparing the second time clock with reference to the first time clock from the first time/frequency generator transmitting information of a time difference to the central processing unit and delaying the phase of the second time clock to compensate for the time difference according to the control of the central processing unit, thereby synchronizing the second time clock with the first time clock;

a buffer for buffering the time clock transmitted from the time clock dualizing unit;

a relay switch for outputting the time clock from the buffer to the time/frequency output unit based upon an output inhibition signal transmitted from the other time/frequency dualizing unit;

a frequency dualizing unit for comparing the second 10 MHz with reference to the first 10 MHz from the first time/frequency generator, transmitting information of a phase difference to the central processing unit and delaying the phase of the 10 MHz to compensate for the phase difference according to the control of the central processing unit, thereby synchronizing the second 10 MHz with the first 10 MHz;

a filter for filtering off noise from the 10 MHz received from the frequency dualizing unit; and a relay switch for transmitting the 10 MHz from the filter to the time/frequency output unit based upon an output inhibition signal transmitted from the other time/frequency dualizing unit.

3. The apparatus according to claim 2, wherein the buffering/normality checking unit comprises:

a first TOD buffer for buffering the first TOD transmitted from the first time/frequency generator;

a second TOD buffer for buffering he second TOD transmitted from the second time/frequency generator; and a TOD checking unit for checking the information about the operation status of the time/frequency generators contained in the signals from the first and second buffers and outputting the first TOD if the first time/frequency generator is determined to operate in normal status and, alternatively, outputting the second TOD if the first time/frequency generator is determined to operate in abnormal status.

4. The apparatus according to claim 2, wherein the time clock dualizing unit comprises;

a time clock phase comparator for comparing the first and second time clocks respectively generated by the first and second time/frequency generators and transmitting the time difference derived from comparing to the central processing unit;

a first time clock variable delay unit for compensating a phase of the first time clock using various degrees of phase adjustment according to the control of the central processing unit;

a second time clock variable delay unit for compensating a phase of the second time clock using various degrees of phase adjustment according to the control of the central processing unit; and and OR element for performing a wired OR operation with respect to the time clocks from the first and second time clock variable delay units.

5. The apparatus according to claim 2, wherein the frequency dualizing unit comprises:

a 10 MHz phase comparator for comparing the second 10 MHz from the second time/frequency generator with reference to the first 10 MHz from the first time/frequency generator and transmitting the phase difference to the central processing unit;

a first 10 MHz variable delay unit for compensating the first 10 MHz by delaying it as much as the phase difference according to the control of the central processing unit;

a second 10 MHz variable delay unit for compensating the second 10 MHz by delaying it as much as the phase difference according to the control of the central processing unit;

a switch for receiving the 10 MHz frequencies outputted in synchronization with each by the first and second 10 MHz variable delay units and selecting and outputting one of them according to the control of the central processing unit.

6. The apparatus according to claim 1, wherein the time/frequency output unit comprises:

a first OR element for performing a wired OR operation with respect to the dual frequencies transmitted from the first and second time/frequency dualizing units;

a second OR element for performing the wired OR operation with respect to the dual time clocks transmitted from the first and second time/frequency duplexing units; and a switch for selectively outputting the dual time data respectively transmitted from the first and second time/frequency dualizing units according to the control of the central processing unit.

7. The apparatus according to claim 3, wherein the time clock dualizing unit comprises:

a time clock phase comparator for comparing the first and second time clocks respectively generated by the first and second time/frequency generators and transmitting the time difference derived from comparing to the central processing unit;

a first time clock variable delay unit for compensating a phase of the first time lock using various degrees of phase adjustment according to the control of the central processing unit;

a second time clock variable delay unit for compensating a phase of the second time clock using various degrees of phase adjustment according to the control of the central processing unit; and an OR element for performing a wired OR operation with respect to the time clocks from the first and second time clock variable delay units.

8. The apparatus according to claim 7, wherein the frequency dualizing unit comprises:

a 10 MHz phase comparator for comparing the second 10 MHz from the second time/frequency generator with reference to the first 10 MHz from the first time/frequency generator and transmitting the phase difference to the central processing unit;

a first 10 MHz variable delay unit for compensating the first 10 MHz by delaying it as much as the phase difference according to the control of the central processing unit;

a second 10 MHz variable delay unit for compensating the second 10 MHz by delaying it as much as the phase difference according to the control of the central processing unit;

a switch for receiving the 10 MHz frequencies outputted in synchronization with each other by the first and second 10 MHz variable delay units and selecting and outputting one of them according to the control of the central processing unit.

9. The apparatus according to claim 2, wherein time/frequency output unit comprises:

a first OR element for performing a wired OR operation with respect to the dual frequencies transmitted from the first and second time/frequency dualizing units;

a second OR element for performing the wired OR operation with respect to the dual time clocks transmitted from the first and second time/frequency dualizing units; and a switch for selectively outputting the dual time data respectively transmitted from the first and second time/frequency dualizing units according to the control of the central processing unit.

10. The apparatus according to claim 9, wherein the buffering/normality checking unit comprises:

a first TOD buffer for buffering the first TOD transmitted from the first time/frequency generator;

a second TOD buffer for buffering the second TOD transmitted from the second time/frequency generator; and a TOD checking unit for checking the information about the operation status of the time/frequency generators contained in the signals from the first and second buffers and outputting the first TOD if the first time/frequency generator is determined to operate in normal status and, alternatively, outputting the second TOD if the first time/frequency generator is determined to operate in abnormal status.

11. The apparatus according to claim 10, wherein the clock dualizing unit comprises:

a time clock phase comparator for comparing the first and second time clocks respectively generated by the first and second time/frequency generators and transmitting the time difference derived from comparing to the central processing unit;

a first time clock variable delay unit for compensating a phase of the first time clock using various degrees of phase adjustment according to the control of the central processing unit;

a second time clock variable delay unit for compensating a phase of the second time clock using various degrees of phase adjustment according to the control of the central processing unit; and an OR element for performing a wired OR operation with respect to the time clocks from the first and second time clock variable delay units.

12. The apparatus according to claim 11, wherein the frequency dualizing unit comprises:

a 10 MHz phase comparator for comparing the second 10 MHz from the second time/frequency generator with reference to the first 10 MHz from the first time/frequency generator and transmitting the phase difference to the central processing unit;

a first 10 MHz variable delay unit for compensating the first 10 MHz by delaying it as much as the phase difference according to the control of the central processing unit;

a second 10 MHz variable delay unit for compensating the second 10 MHz by delaying it as much as the phase difference according to the control of the central processing unit;

a switch for receiving the 10 MHz frequencies outputted in synchronization with each other by the first and second 10 MHz variable delay units and selecting and outputting one of them according to the control of the cental processing unit.

13. The apparatus according to claim 3, wherein the frequency dualizing unit comprises:

A 10 MHz phase comparator for comparing the second 10 MHz from the second time/frequency generator with reference to the first 10 MHz from the first time/frequency generator and transmitting the phase difference to the central processing unit;

a first 10 MHz variable delay unit for compensating the first 10 MHz by delaying it as much as the phase difference according to the control of the central processing unit;

a second 10 MHz variable delay unit for compensating the second 10 MHz by delaying it as much as the phase difference according to the control of the central processing unit;

a switch for receiving the 10 MHz frequencies outputted in synchronization with each other by the first and second 10 MHz variable delay units and selecting and outputting one of them according to the control of the central processing unit.

14. The apparatus according to claim 4, wherein time/frequency output unit comprises:
- a first OR element for performing a wired OR operation with respect to the dual frequencies transmitted from the first and second time/frequency dualizing units;
- a second OR element for performing the wired OR operation with respect to the dual time clocks transmitted from the first and second time/frequency dualizing units; and
- a switch for selectively outputting the dual time data respectively transmitted from the first and second time/frequency duplexing units according to the control of the central processing unit.

15. The apparatus according to claim 5, wherein time/frequency output unit comprises:
- a first OR element for performing a wired OR operation with respect to the dual frequencies transmitted from the first and second time/frequency dualizing units;
- a second OR element for performing the wired OR operation with respect to the dual time clocks transmitted from the first and second time/frequency dualizing units; and
- a switch for selectively outputting the dual time data respectively transmitted from the first and second time/frequency dualizing units according to the control of the central processing unit.

* * * * *